US012677226B2

(12) United States Patent (10) Patent No.: US 12,677,226 B2
Gao (45) Date of Patent: Jul. 7, 2026

(54) METHOD AND APPARATUS FOR CONFIGURING RADIO FREQUENCY TRANSMIT POWER, ELECTRONIC CHIP, AND ELECTRONIC DEVICE

(71) Applicant: SPREADTRUM COMMUNICATIONS (SHANGHAI) CO., LTD., Shanghai (CN)

(72) Inventor: Xiang Gao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 389 days.

(21) Appl. No.: 18/344,899

(22) Filed: Jun. 30, 2023

(65) Prior Publication Data

US 2023/0362832 A1 Nov. 9, 2023

Related U.S. Application Data

(63) Continuation of application No. PCT/CN2021/131061, filed on Nov. 17, 2021.

(30) Foreign Application Priority Data

Dec. 30, 2020 (CN) .......................... 202011606097.2

(51) Int. Cl.
*H04W 52/28* (2009.01)
*H04B 1/3827* (2015.01)

(52) U.S. Cl.
CPC ........ *H04W 52/283* (2013.01); *H04B 1/3838* (2013.01)

(58) Field of Classification Search
CPC ..... H04W 12/06; H04W 8/183; H04W 76/10; H04W 52/367; H04W 88/06;

(Continued)

(56) References Cited

U.S. PATENT DOCUMENTS 10,212,667 B1 * 2/2019 Govindassamy ...........................
H04W 52/0274
2015/0111608 A1 4/2015 Kazmi et al.
(Continued)

FOREIGN PATENT DOCUMENTS

CN 104684060 A 6/2015
CN 106605427 A 4/2017
(Continued)

OTHER PUBLICATIONS

International Search Report (PCT/CN2021/131061); Date of Mailing: Feb. 10, 2022.

(Continued)

*Primary Examiner* — Golam Sorowar
(74) *Attorney, Agent, or Firm* — Wiersch Law Group

(57) ABSTRACT

Provided are a method and an apparatus for configuring a radio frequency transmit power, an electronic chip, and an electronic device. The method includes obtaining an application scenario determining result corresponding to a current application scenario of a communication device; confirming current CPN information of the communication device; confirming current home operator information of the communication device; performing match retrieval in a power control parameter database based on the application scenario determining result, the current home operator information, and the current CPN information to obtain a power setting parameter value corresponding to the application scenario determining result, the current home operator information, and the current CPN information; and configuring a transmit power of an RF module based on the power setting parameter value.

5 Claims, 3 Drawing Sheets

(58) Field of Classification Search
CPC ......... H04W 24/02; H04W 8/22; H04W 4/50;
H04W 48/18; H04W 12/03; H04W
12/0471; H04W 16/14; H04W 24/10;
H04W 52/146; H04W 72/04; H04L
41/082; H04L 41/0866; H04L 63/00;
H04L 63/08; H04L 67/34; H04L 41/0843;
H04L 41/0869; H04L 63/0428; H04L
63/0435; H04L 63/061; H04L 63/0823;
H04L 63/18; H04L 63/20; H04L 67/125;
H04B 1/3816; H04B 17/336; H04B
1/3838; H04B 17/203; H04B 17/328;
H04B 5/24; H04B 5/45; H04B 5/77;
H04B 7/0404
See application file for complete search history.

(56) References Cited

U.S. PATENT DOCUMENTS

| | | | | |
|---|---|---|---|---|
| 2022/0078725 | A1* | 3/2022 | Zhou | .................. H04W 52/367 |
| 2022/0086771 | A1* | 3/2022 | Lu | ...................... H04W 52/367 |
| 2024/0089872 | A1* | 3/2024 | Bergljung | ............. H04W 52/34 |
| 2024/0275418 | A1* | 8/2024 | Curtiss | ................ H04W 52/225 |
| 2024/0430825 | A1* | 12/2024 | Lee | ................... H04W 72/0473 |

FOREIGN PATENT DOCUMENTS

| | | | | |
|---|---|---|---|---|
| CN | 109391904 | A | 2/2019 | |
| CN | 109982423 | A | 7/2019 | |
| CN | 109995738 | A | 7/2019 | |
| CN | 110572172 | A | 12/2019 | |
| CN | 111030717 | A | 4/2020 | |
| CN | 112822762 | A | 5/2021 | |
| EP | 3742823 | A1 * | 11/2020 | ............ H04W 72/23 |
| WO | 2017088524 | A1 | 6/2017 | |

OTHER PUBLICATIONS

First Office Action(CN202011606097.2); Date of Mailing: Jul. 5, 2022.
Second Office Action(CN202011606097.2); Date of Mailing: Dec. 1, 2022.

* cited by examiner

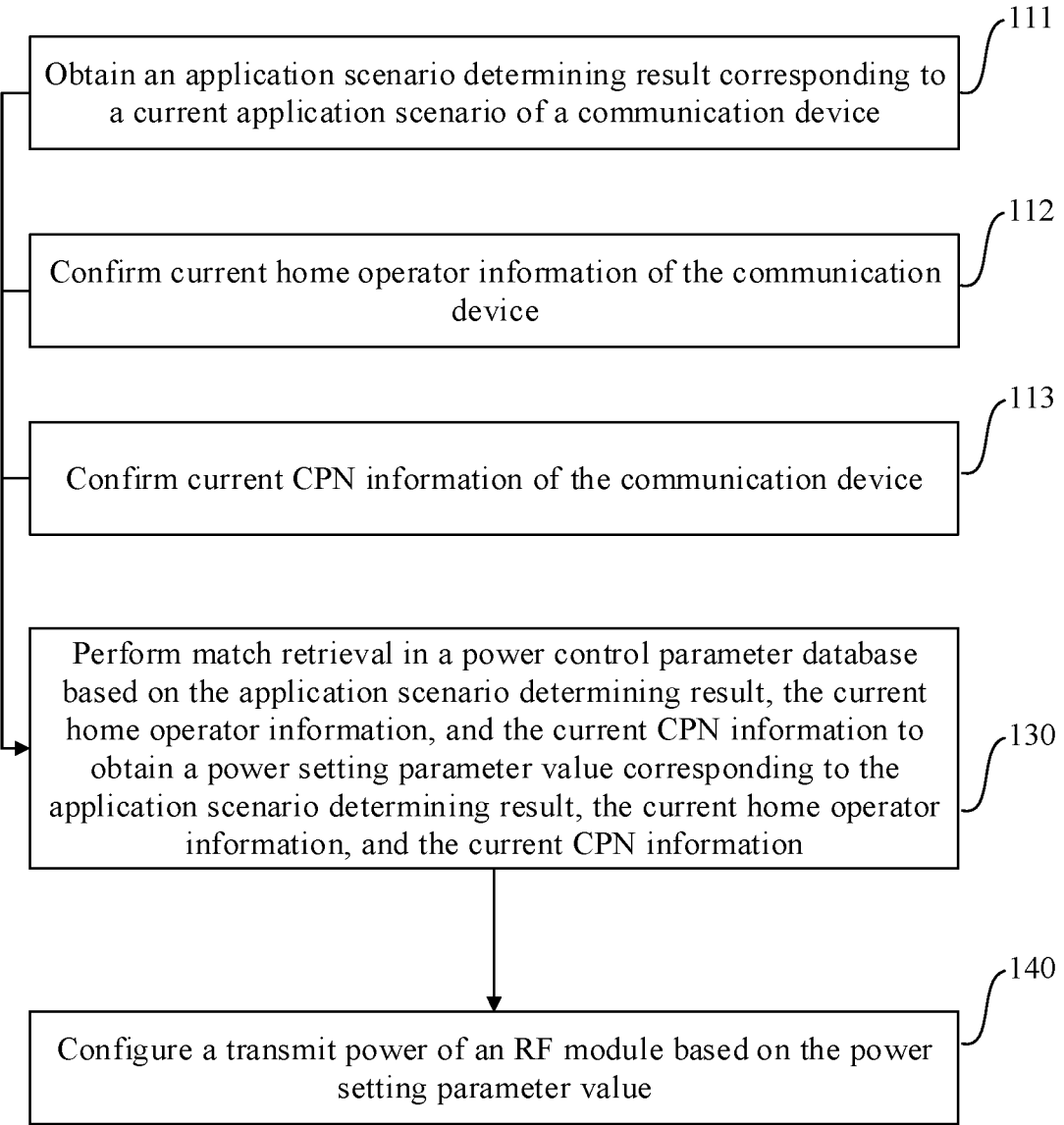

Obtain an application scenario determining result corresponding to a current application scenario of a communication device ⌐111

Confirm current home operator information of the communication device ⌐112

Confirm current CPN information of the communication device ⌐113

Perform match retrieval in a power control parameter database based on the application scenario determining result, the current home operator information, and the current CPN information to obtain a power setting parameter value corresponding to the application scenario determining result, the current home operator information, and the current CPN information ⌐130

Configure a transmit power of an RF module based on the power setting parameter value ⌐140

FIG. 1

METHOD AND APPARATUS FOR CONFIGURING RADIO FREQUENCY TRANSMIT POWER, ELECTRONIC CHIP, AND ELECTRONIC DEVICE

CROSS-REFERENCE TO RELATED APPLICATIONS

The present disclosure is a continuation of International Application No. PCT/CN2021/131061, filed on Nov. 17, 2021, which claims priority to Chinese Patent Application No. 202011606097.2, filed on Dec. 30, 2020. All of the aforementioned applications are incorporated herein by reference in their entireties.

TECHNICAL FIELD

The present application relates to the field of communication technologies, and in particular, to a method and an apparatus for configuring a radio frequency (RF) transmit power, an electronic chip, and an electronic device.

BACKGROUND

A specific absorption rate (SAR) is a measure of radiated RF energy received by an exposed part of a human body when a wireless communication product such as a mobile phone is used. A SAR test can evaluate safety of using a low-power transmitter in close proximity to the human body. A rate of electromagnetic waves absorbed by the human body varies with a frequency band. SAR adjustment is actually to adjust a maximum transmit power of a wireless communication product in different frequency bands such that the SAR meets an official standard.

The SAR is usually adjusted based on hardware of a terminal. Specifically, a transmit power (a transmit power) of each frequency band of an RF device is adjusted (usually reduced relative to a maximum transmit power, that is, backed off) based on a SAR test scenario requirement and limit requirement. For example, a set of power back-off values of each frequency band in each mode is stored in a non-volatile memory of a mobile phone. A corresponding power back-off value is called based on a current communication mode and communication frequency band of the mobile phone. An RF device of the mobile phone is configured based on the called power back-off value.

However, in actual application scenarios, there are different SAR test standards in different regions and countries, including test methods (simplest tests such as answering a call through an earpiece with a mobile phone handheld and answering a call through a headset) and limit requirements (for example, the European Union requires 2 W/kg (10 g average) and Korea requires 1.6 W/kg (1 g average)). Consequently, a communication product can only adapt to a standard of one region/country or standards of a plurality of regions/countries through a convention. The communication product is limited to the lowest standard. This greatly reduces flexibility of an application scenario of the communication product. In addition, in many regions/countries, the communication product cannot achieve maximum wireless performance under a standard in a current region/country.

SUMMARY

In view of problems in the related art that flexibility of an application scenario of a communication product is limited due to different standards for adjusting a SAR in different regions/countries, and the communication product cannot achieve maximum wireless performance under a standard in a current region/country, the present disclosure provides a method and an apparatus for configuring an RF transmit power, an electronic chip, and an electronic device, and further provides a computer-readable storage medium.

Embodiments of the present disclosure adopt the following technical solutions.

In a first aspect, the present disclosure provides a method for configuring a radio frequency (RF) transmit power, including:

obtaining an application scenario determining result corresponding to a current application scenario of a communication device;

confirming current customer premises network (CPN) information of the communication device;

confirming current home operator information of the communication device;

performing match retrieval in a power control parameter database based on the application scenario determining result, the current home operator information, and the current CPN information to obtain a power setting parameter value corresponding to the application scenario determining result, the current home operator information, and the current CPN information; and configuring a transmit power of an RF module based on the power setting parameter value.

In some embodiments, the performing the match retrieval in the power control parameter database based on the application scenario determining result, the current home operator information, and the current CPN information includes: performing the match retrieval in the power control parameter database of a local device.

In some embodiments, the performing the match retrieval in the power control parameter database based on the application scenario determining result, the current home operator information, and the current CPN information further includes:

in response to that the power setting parameter value matching the application scenario determining result, the current home operator information, and the current CPN information is not stored in the power control parameter database of the local device, uploading the application scenario determining result, the current home operator information, and the current CPN information to a cloud server in such a manner that the power setting parameter value corresponding to the application scenario determining result, the current home operator information, and the current CPN information is obtained from the cloud server.

In some embodiments, the method further includes: confirming the application scenario determining result by an application processor of the communication device.

In some embodiments, the method further includes: reading the current home operator information and the current CPN information through a communication chip of the communication device.

In a second aspect, the present disclosure provides an apparatus for configuring a radio frequency (RF) transmit power, and the apparatus is configured to:

obtain an application scenario determining result corresponding to a current application scenario of a communication device;

confirm current home operator information of the communication device;

confirm current CPN information of the communication device;

perform match retrieval in a power control parameter database based on the application scenario determining result, the current home operator information, and the current CPN information to obtain a power setting parameter value corresponding to the application scenario determining result, the current home operator information, and the current CPN information; and configure a transmit power of an RF module based on the power setting parameter value.

In some embodiments, the apparatus further includes a memory configured to store the power control parameter database, and the power setting parameter value obtaining module is configured to perform the match retrieval in the power control parameter database stored in the memory.

In some embodiments, the apparatus is further configured to:

in response to that the power setting parameter value matching the application scenario determining result, the current home operator information, and the current CPN information is not stored in the power control parameter database stored in the memory, upload the application scenario determining result, the current home operator information, and the current CPN information to a cloud server in such a manner that the power setting parameter value corresponding to the application scenario determining result, the current home operator information, and the current CPN information is obtained from the cloud server.

In a third aspect, the present disclosure provides an electronic chip, and the electronic chip includes a processor configured to execute computer program instructions stored in a memory, and the computer program instructions, when executed by the processor, cause the electronic chip to perform the method provided in the first aspect.

In a fourth aspect, the present disclosure provides an electronic chip, and the electronic chip includes a processor configured to execute computer program instructions stored in a memory, and the computer program instructions, when executed by the processor, cause the electronic chip to generate a corresponding application scenario determining result based on a current application scenario of a communication device.

In a fifth aspect, the present disclosure provides an electronic device, and the electronic device includes a memory configured to store computer program instructions, and a first processor and a second processor that are configured to execute the computer program instructions. The first processor is configured to execute at least one computer program instruction of the computer program instructions stored in the memory, and the at least one computer program instruction, when executed by the first processor, causes the first processor to generate an application scenario determining result based on a current application scenario of a communication device. The second processor is configured to execute at least one another computer program instruction of the computer program instructions stored in the memory, and the at least one another computer program instruction, when executed by the second processor, causes the second processor to obtain the application scenario determining result and perform the method provided in the first aspect.

In a sixth aspect, the present disclosure provides a non-transitory computer-readable storage medium, the computer programs, when run on a computer, cause the computer to perform the method provided in the first aspect.

The above technical solutions provided by the embodiments of the present disclosure can achieve at least the following technical effects.

According to the method provided in the embodiments of the present disclosure, a matched power setting parameter value may be confirmed based on a current specific condition of the communication device to configure the transmit power of an RF module. In comparison with a method in the prior art, according to the method in the embodiments of the present disclosure, a maximum transmit power can be realized while it is ensured that the communication device meets a SAR standard, to improve working performance of the communication device.

BRIEF DESCRIPTION OF DRAWINGS

FIG. 1 is a flowchart of a method for configuring an RF transmit power according to an embodiment of the present disclosure;

DESCRIPTION OF EMBODIMENTS

Figure 2:
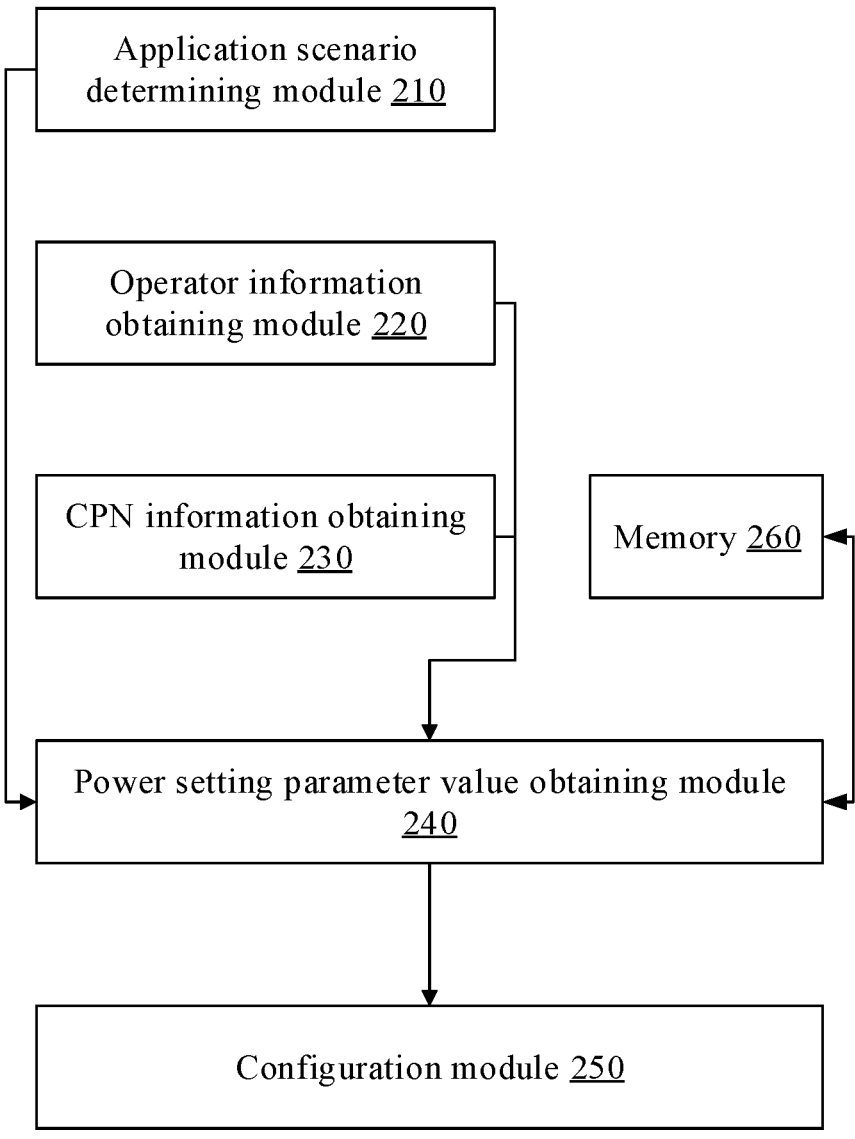
FIG. 2 is a schematic structural diagram of an apparatus for configuring an RF transmit power according to an embodiment of the present disclosure.

To make the technical solutions of the present disclosure clearer, the technical solutions in the present disclosure are clearly and completely described below with reference to embodiments and corresponding accompanying drawings of the present disclosure. The described embodiments are some exemplary embodiments rather than all of the embodiments of the present disclosure. All other embodiments obtained by a person of ordinary skill in the art based on the embodiments of the present disclosure shall fall within the scope of the present disclosure.

The terms used in the embodiments of the present disclosure are used only to explain the specific embodiments of the present disclosure, and are not intended to limit the present disclosure.

A purpose of adjusting a SAR is to make the SAR meet a standard in a current region/country. Specifically, a transmit power of an RF device (for example, an RF device for implementing cellular mobile communication) is adjusted through a power setting parameter value such that the SAR meets the standard in the current region/country. For example, the power setting parameter value is a power back-off value. The transmit power is reduced based on a maximum transmit power of the RF device (a reduced value is the power back-off value). For another example, the power setting parameter value is the maximum power, and the transmit power of the RF device is set to the maximum power.

Power setting parameter values to be selected to set the transmit power of the RF device are different for SAR standards in different regions/countries. Therefore, if the power setting parameter values corresponding to the standards in different regions/countries are prestored, when a communication device works, the corresponding power setting parameter value is called to configure the RF device based on the region/country in which the communication device is located. In this way, the communication device can work in different regions/countries.

In an actual application scenario, a rate of electromagnetic waves absorbed by a human body is different for different wireless communication modes and different wireless communication frequency bands. Therefore, for a same SAR, when the communication device works in different frequency bands, transmit powers satisfying the SAR are different, and power setting parameter values used when the RF device is configured are also different. Therefore, different frequency bands also need to be considered when the power setting parameter values are prestored.

Therefore, in an embodiment of the present disclosure, power setting parameter values corresponding to each mode and each frequency band in different regions/countries are prestored. When the communication device works, current CPN information of the communication device is obtained, and a current wireless communication mode of the communication device and a wireless signal frequency band currently used by the communication device are confirmed based on the CPN information. A local communication network accessed by the communication device is confirmed based on the CPN information. The country/region in which the communication device is currently located is confirmed based on the local communication network accessed by the communication device. The corresponding power setting parameter value is called based on the country/region in which the communication device is currently located, the current wireless communication mode of the communication device, and the wireless signal frequency band currently used by the communication device. The transmit power of the RF device is set to the called power setting parameter value.

In an actual application scenario, with a constant transmit power, measured SARs are different in different application scenarios of the communication device. For example, on the premise that the transmit power is constant, a measured SAR in an application scenario in which a user answers a call through a mobile phone with the mobile phone handheld is different from that in an application scenario in which the user answers the call through a headset connected to the mobile phone. When the user uses a cellular mobile communication technology to implement a call, a measured SAR in an application scenario in which Wireless Fidelity (Wi-Fi) and/or Bluetooth of the mobile phone is enabled is different from that in an application scenario in which Wi-Fi and/or Bluetooth of the mobile phone is disabled. Therefore, in an embodiment of the present disclosure, different application scenarios also need to be considered when the power setting parameter values are prestored. When the communication device works and a power setting parameter value needs to be called, a current application scenario of the communication device needs to be analyzed first, and a power setting parameter value corresponding to the application scenario needs to be called.

In an actual application scenario, some communication operators have established their own SAR standards. In addition, if the communication device is a test device (for example, a subscriber identity module (SIM) card of the communication device is a test card that does not belong to any operator), the communication device also needs to comply with a SAR standard specific to the test device. Therefore, in an embodiment of the present disclosure, different communication operators also need to be considered when the power setting parameter values are prestored. When the communication device works and a power setting parameter value needs to be called, a communication operator of the communication device needs to be analyzed first, and a power setting parameter value corresponding to the communication operator needs to be called.

The communication operator of the communication device and the local operator accessed by the communication device are different concepts. For example, a mobile phone of a user uses a SIM card of China Mobile, and a communication operator of the mobile phone is China Mobile. When the user is in China, the mobile phone accesses a communication network of China Mobile, and a local operator accessed by the mobile phone and the communication operator of the mobile phone are both China Mobile. When the user travels to France, the mobile phone accesses a local communication operator (for example, O2) in France through an international roaming service of China Mobile, the local operator accessed by the mobile phone is O2, and the communication operator of the mobile phone is China Mobile.

In an embodiment of the present disclosure, a power control parameter database is first created, and power setting parameter values corresponding to different communication operators, different application scenarios, different regions/countries, different communication modes, and different communication frequency bands are prestored in the power control parameter database.

For example, for a mobile phone that uses a cellular mobile communication technology to realize a call, a power control parameter database is created and settings of power setting parameter values are prestored in the power control parameter database. The power control parameter database includes the following settings of the power setting parameter values.

1. A communication operator is China Mobile; an earpiece is used to answer a call, and Wi-Fi and Bluetooth are disabled; the mobile phone is located in the Chinese mainland and camps on a network of China Mobile; a communication mode is 4G; a communication frequency band is Band 34; and a corresponding power back-off value is 1 dB (a positive value indicates 1 dB back-off based on a maximum transmit power of a terminal).

2. A communication operator is O2; the earpiece is used to answer a call, and Wi-Fi and Bluetooth are disabled; the mobile phone is located in France and camps on a network of O2; a communication mode is 4G Long Term Evolution (LTE); a communication frequency band is Band 20; and a corresponding power back-off value is 1.5 dB (a positive value indicates 1.5 dB back-off based on the maximum transmit power of the terminal).

3. A test SIM or universal SIM (USIM) card is used (MCC-MNC=001-01, where MCC refers to a mobile country code, and MNC refers to a mobile network code); the earpiece is used to answer the call, Wi-Fi is enabled, and the mobile phone camps on a non-operator's experimental network or connects to a test meter (for example, network MCC-MNC=001-01, which does not belong to any one entity operator); a communication mode is code division multiple access (WCDMA); a communication frequency band is Band 8; and a shipment destination is China, and a corresponding power back-off value is 2.5 dB (a positive value indicates 2.5 dB back-off based on the maximum transmit power of the terminal). For default value configurations, reference is made to mandatory certification requirements of a place to which a product is shipped, such as mandatory approval requirements of the state radio regulatory commission of the People's Republic of China (SRRC) or certification requirements of the Federal Communications Commission of the United States (FCC).

FIG. 1 is a flowchart of a method for configuring a power setting parameter value according to an embodiment of the present disclosure. When a communication device works, the communication device performs steps 111, 112, 113, and 114 shown in FIG. 1 to configure a transmit power of an RF device.

At step 111, an application scenario determining result corresponding to a current application scenario of the communication device is obtained.

At step 112, current home operator information of the communication device is confirmed.

At step 113, current CPN information of the communication device is confirmed.

At step 130, match retrieval is performed in a power control parameter database based on the application scenario determining result, the current home operator information, and the current CPN information to obtain a power setting parameter value corresponding to the application scenario determining result, the current home operator information, and the current CPN information.

At step 140, a transmit power of an RF module is configured based on the power setting parameter value.

In some embodiments, step 130 includes: determining a communication operator of the communication device based on the home operator information; determining, based on the current CPN information, a current communication mode of the communication device, a current communication frequency band of the communication device, and a local operator currently accessed by the communication device; determining, based on the local operator currently accessed by the communication device, a region/country in which the communication device is currently located; and retrieving the matched power setting parameter value based on the application scenario determining result of the communication device, the communication operator of the communication device, the current communication mode of the communication device, the current communication frequency band of the communication device, and the region/country in which the communication device is currently located.

According to the method provided in the embodiment shown in FIG. 1, the matched power setting parameter value may be confirmed based on a current specific condition of the communication device to configure the transmit power of the RF module. In comparison with a method in the related art, according to the method provided in the embodiment shown in FIG. 1, a maximum transmit power can be realized while it is ensured that the communication device meets a SAR standard, to greatly improve working performance of the communication device.

In an actual application scenario, the power control parameter database may be stored on the communication device or a cloud server. In most application scenarios, the communication device can implement external communication and access the cloud server only after the RF device is configured. Therefore, in an embodiment of the present disclosure, the power control parameter database is stored on the local communication device to ensure that the power setting parameter value can be smoothly obtained. In an embodiment, step 130 includes performing the match retrieval in the power control parameter database of a local device.

In some embodiments, when the power control parameter database is created and power setting parameter values are prestored, not all power setting parameter values may be taken into account. For example, a power setting parameter value corresponding to a region A is not considered. Therefore, when the communication device performs the match retrieval in the power control parameter database of the local device, the power setting parameter value matching the application scenario determining result, the home operator information, and the CPN information may not exist in the power control parameter database of the local device. For example, a user travels to the region A, but the power setting parameter value corresponding to the region A is not prestored in a built-in power control parameter database of a mobile phone.

In view of the foregoing case, step 130 includes: firstly performing the match retrieval in the power control parameter database of the local device; and in response to that the power setting parameter value matching the application scenario determining result, the current home operator information, and the current CPN information is not stored in the power control parameter database of the local device, updating the application scenario determining result, the current home operator information, and the current CPN information to the cloud server to obtain the power setting parameter value corresponding to the application scenario determining result, the current home operator information, and the current CPN information from the cloud server.

For example, in an application scenario, when a power control parameter database is created in a mobile phone of a user A and power setting parameter values are prestored for the first time, the power setting parameter value corresponding to the region A is not considered. When the user travels to the region A, because the power setting parameter value corresponding to the region A is not prestored in the built-in power control parameter database of the mobile phone, the mobile phone cannot obtain the available power setting parameter value after performing match retrieval in the power control parameter database. In this case, the mobile phone sends the current application scenario determining result, home operator information, and CPN information to the cloud server. The cloud server performs match retrieval to obtain the power setting parameter value corresponding to the application scenario determining result, home operator information, and CPN information. Finally, the cloud server sends the retrieved power setting parameter value to the mobile phone.

In some embodiments, step 130 includes: in response to that the power setting parameter value matching the application scenario determining result, the current home operator information, and the current CPN information is not stored in the power control parameter database of the local device, supplementary information of the power setting parameter value is downloaded from the cloud server to expand the power control parameter database of the local device. Match retrieval is performed in an expanded power control parameter database to obtain the power setting parameter value corresponding to the application scenario determining result, the current home operator information, and the current CPN information.

For example, in an application scenario, when a power control parameter database is created in a mobile phone of a user A and power setting parameter values are prestored for the first time, the power setting parameter value corresponding to the region A is not considered. When the user travels to the region A, because the power setting parameter value corresponding to the region A is not prestored in the built-in power control parameter database of the mobile phone, the mobile phone cannot obtain the available power setting parameter value after performing match retrieval in the power control parameter database. In this case, the mobile phone reports to the cloud server that the power setting parameter value corresponding to the region A is missing, and downloads the power setting parameter value corresponding to the region A from the cloud server to expand the built-in power control parameter database of the mobile phone. Then, the mobile phone performs match retrieval in the expanded power control parameter database to obtain the available power setting parameter value.

In some embodiments, step 130 includes: for a communication mode (for example, cellular mobile network communication), in response to that the power setting parameter value matching the application scenario determining result, the home operator information, and the CPN information is not stored in the power control parameter database of the local device, performing data interaction with the cloud server in another communication mode (for example, Wi-Fi or Bluetooth) to obtain the power setting parameter value corresponding to the application scenario determining result, the home operator information, and the CPN information. In some embodiments, the transmit power of the RF device is set to a preset minimum RF transmit power, and data interaction is performed with the cloud server at the minimum RF transmit power to obtain the power setting parameter value corresponding to the application scenario determining result, the current home operator information, and the current CPN information. The transmit power of the RF device is reconfigured after the power setting parameter value is obtained.

In the 1990s, a technological improvement can be clearly defined as a hardware improvement (for example, an improvement of a circuit structure such as a diode, a transistor, or a switch) or a software improvement (for example, an improvement of a method procedure). However, with the development of technologies, improvements of many method procedures can be regarded as direct improvements of hardware circuit structures. Almost all designers obtain a corresponding hardware circuit structure by programming an improved method procedure into a hardware circuit. Therefore, it is not meant that an improvement of a method procedure cannot be realized by using a hardware entity module, For example, a programmable logic device (PLD) (such as a field programmable gate array (FPGA)) is such an integrated circuit, and its logic function is determined by programming the device by an access party. A designer can "integrate" a digital apparatus onto a PLD through programming, without requiring a chip manufacturer to design and manufacture a special integrated circuit chip. Nowadays, this kind of programming replaces manual manufacturing of an integrated circuit chip and is mostly realized by using a "logic compiler". The logic compiler is similar to a software compiler used to develop and compile a program, and original code before compilation needs to be compiled in a specific programming language that is referred to as a hardware description language (HDL) herein. There are many kinds of HDLs, such as an advanced Boolean expression language (ABEL), an alternate hardware description language (AHDL), Confluence, a Cornell university programming language (CUPL), HDCal, a Java hardware description language (JHDL), Lava, Lola, MyHDL, PALASM, and a Ruby hardware description language (RHDL). At present, a very-high-speed integrated circuit hardware description language (VHDL) and Verilog are most commonly used. It should be understood by a person skilled in the art that a hardware circuit of a logic method procedure can be easily obtained by using the above hardware description languages to perform logic programming on the method procedure and programming the method procedure into an integrated circuit.

Therefore, according to the method provided in the present disclosure, the present disclosure provides an apparatus for configuring an RF transmit power. FIG. 2 is a schematic structural diagram of an apparatus for configuring an RF transmit power according to an embodiment of the present disclosure. As shown in FIG. 2, the apparatus includes an application scenario determining module 210, an operator information obtaining module 220, a CPN information obtaining module 230, a power setting parameter value obtaining module 240, and a configuration module 250.

The application scenario determining module 210 is configured to obtain an application scenario determining result corresponding to a current application scenario of a communication device.

The operator information obtaining module 220 is configured to confirm current home operator information of the communication device.

The CPN information obtaining module 230 is configured to confirm current CPN information of the communication device.

The power setting parameter value obtaining module 240 is configured to perform match retrieval in a power control parameter database based on the application scenario determining result, the current home operator information, and the current CPN information to obtain a power setting parameter value corresponding to the application scenario determining result, the current home operator information, and the current CPN information.

The configuration module 250 is configured to configure a transmit power of an RF module based on the power setting parameter value.

In some embodiments, the apparatus for configuring an RF transmit power further includes a memory 260 configured to store the power control parameter database.

The power setting parameter value obtaining module 240 is configured to perform the match retrieval in the power control parameter database stored in the memory 260.

In some embodiments, the power setting parameter value obtaining module 240 is further configured to: in response to that the power setting parameter value matching the application scenario determining result, the current home operator information, and the current CPN information is not stored in the power control parameter database stored in the memory, upload the application scenario determining result, the current home operator information, and the current CPN information to a cloud server, to obtain the power setting parameter value corresponding to the application scenario determining result, the current home operator information, and the current CPN information from the cloud server.

In some embodiments, the power setting parameter value obtaining module 240 is configured to:

in response to that the power setting parameter value matching the application scenario determining result, the current home operator information, and the current CPN information is not stored in the power control parameter database stored in the memory, download supplementary information of the power setting parameter value from the cloud server to expand the power control parameter database of a local device; and perform match retrieval in an expanded power control parameter database to obtain the power setting parameter value corresponding to the application scenario determining result, the current home operator information, and the current CPN information.

In the description of the embodiments of this specification, for ease of description, when the apparatus is described, the functions are divided into various modules and described respectively, and division to the modules is merely division of logical functions. The functions of the modules are implemented in the same or a plurality of software and/or hardware.

The apparatuses proposed in the embodiments of the present disclosure may be fully or partially integrated into a physical entity or may be physically separate. These modules may be all implemented in a form of software through processing element calling; may be all implemented in a form of hardware; or may be partially implemented in a form of software through processing element calling, and partially implemented in a form of hardware. For example, a detection module may be a separate processing element or integrated into a chip of an electronic device. Implementation of other modules is similar. In addition, all or part of these modules may be integrated or implemented independently. During the implementation, each step or module of the foregoing methods may be implemented by an integrated logic circuit of hardware in a processing element or by using an instruction in a form of software.

For example, the foregoing modules may be one or more integrated circuits configured to implement the foregoing methods, such as one or more application-specific integrated circuits (ASICs), one or more digital signal processors (DSPs), or one or more field-programmable gate arrays (FPGAs). For another example, these modules may be integrated and implemented in a form of a system-on-a-chip (SOC).

In an actual application scenario, when the method in the embodiments of the present disclosure is implemented, the home operator information and CPN information are obtained based on a wireless communication protocol stack (such as the wireless communication protocol stack specified by the 3GPP standard organization). In some embodiments, the current home operator information and the current CPN information are read by a communication chip (such as a wireless modem chip) on a communication device.

In an actual application scenario, when the method in the embodiments of the present disclosure is implemented, the current application scenario of the communication device is identified and analyzed through an application processing system loaded on the communication device, to generate the application scenario determining result. Specifically, the application scenario determining result is confirmed through an application processor of the communication device.

Figure 3:
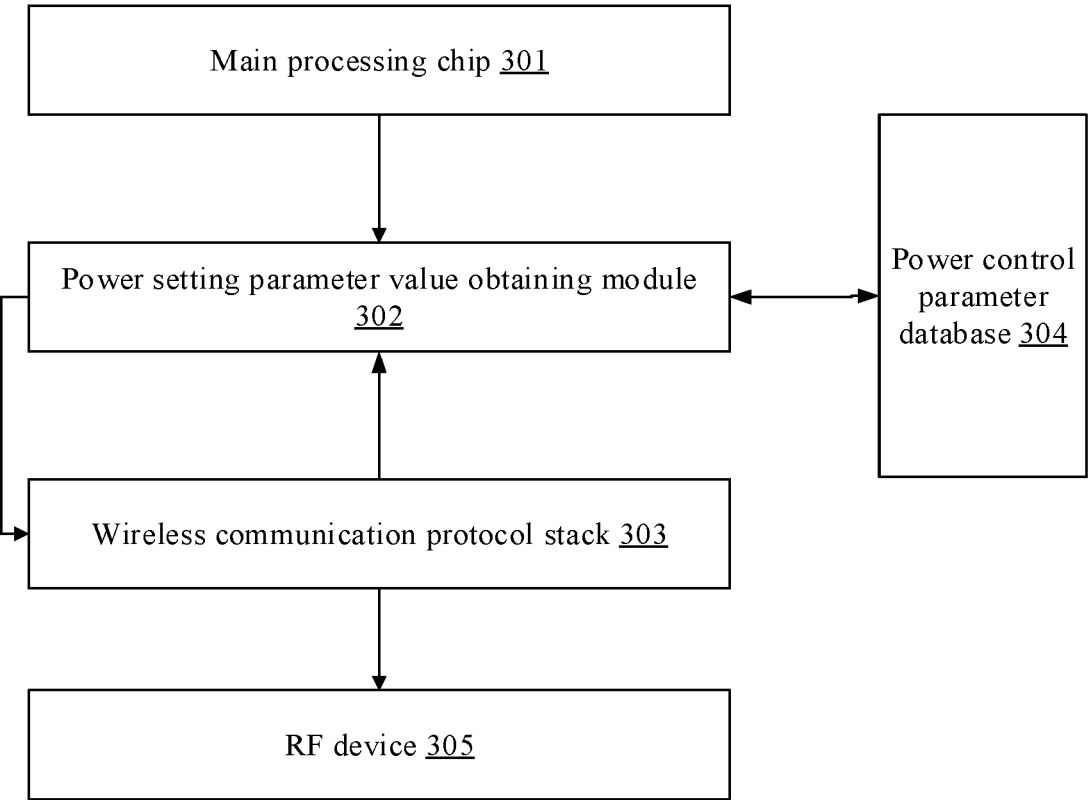
FIG. 3 is a schematic diagram of an application scenario for configuring an RF transmit power according to an embodiment of the present disclosure.

FIG. 3 is a schematic diagram of an application scenario of configuring an RF transmit power according to an embodiment of the present disclosure. As shown in FIG. 3, a main processing chip (an application processing chip) 301 of a mobile phone identifies and analyzes a current application scenario of the mobile phone to generate an application scenario determining result. The main processing chip (application processing chip) 301 outputs the application scenario determining result to a power setting parameter value obtaining module 302.

The mobile phone reads home operator information and CPN information of the mobile phone through a wireless communication protocol stack 303. The wireless communication protocol stack 303 sends the home operator information and the CPN information of the mobile phone to the power setting parameter value obtaining module 302.

The power setting parameter value obtaining module 302 performs match retrieval in a built-in power control parameter database 304 of the mobile phone based on the application scenario determining result, the home operator information, and the CPN information to obtain a power setting parameter value matching the application scenario determining result, the home operator information, and the CPN information.

The power setting parameter value obtaining module 302 sends the retrieved power setting parameter value to the wireless communication protocol stack 303. The wireless communication protocol stack 303 configures a transmit power of an RF device 305 based on the power setting parameter value.

In some embodiments, the power setting parameter value obtaining module is integrated in a communication chip. An embodiment of the present disclosure provides an electronic chip (a communication chip), the electronic chip includes a processor configured to execute computer program instructions stored in a memory, and the computer program instructions, when executed by the processor, cause the electronic chip to obtain an application scenario determining result and perform the method steps shown in FIG. 1.

In some embodiments, an embodiment of the present disclosure provides an electronic chip (application processing chip), the electronic chip includes a processor configured to execute computer program instructions stored in a memory, and the computer program instructions, when executed by the processor, cause the electronic chip to generate a corresponding application scenario determining result based on a current application scenario of a communication device.

An embodiment of the present disclosure provides an electronic device. The electronic device includes a memory configured to store a computer program instruction, and a first processor and a second processor that are configured to execute the computer program instructions.

The first processor is configured to execute computer program instructions stored in the memory. The computer program instructions, when executed by the first processor, cause the first processor to generate a corresponding application scenario determining result based on a current application scenario of a communication device.

The second processor is configured to execute other computer program instructions stored in the memory. The other computer program instructions, when executed by the second processor, cause the second processor to obtain the application scenario determining result and perform the method steps shown in FIG. 1.

In some embodiments, the memory of the electronic device may include different storage modules. The storage modules may be independent storage apparatuses or storage units integrated in an electronic chip. For example, in some embodiments, the electronic device includes a first chip (an application processing chip) and a second chip (communication chip).

The first chip includes a first storage unit and the first processor. The first processor is configured to execute computer program instructions stored in the first storage unit, and the computer program instructions, when executed by the first processor, cause the first processor to generate the corresponding application scenario determining result based on the current application scenario of the communication device.

The second chip includes a second storage unit and the second processor. The second processor is configured to execute computer program instructions stored in the second storage unit, and the computer program instructions, when executed by the second processor, cause the second processor to obtain the application scenario determining result and perform the method steps shown in FIG. 1.

In an embodiment of the present disclosure, the one or more computer programs are stored in the memory, and the one or more computer programs include instructions. The instructions, when executed by the device, cause the device to perform steps of the methods described in the embodiments of the present disclosure.

In an embodiment of the present disclosure, the processor of the electronic device may be an SOC. The processor may include a central processing unit (CPU), and may include a processor of another type. In an embodiment of the present disclosure, the processor of the electronic device may be a PWM control chip.

In an embodiment of the present disclosure, the processor may include, for example, a CPU, a DSP, a microcontroller, or a digital signal processor, and may further include a GPU, an embedded neural network processing unit (NPU), and an image signal processor (ISP). The processor may include a necessary hardware accelerator, a logic processing hardware circuit such as an ASIC, or one or more integrated circuits for controlling the execution of the program of the technical solutions of the present disclosure. In addition, the processor may have a function of operating one or more software programs, and the software program may be stored in a storage medium.

In an embodiment of the present disclosure, the memory of the electronic device may be a read-only memory (ROM), another type of static storage device that can store static information and instructions, a random access memory (RAM), or another type of dynamic storage device that can store information and instructions; may be an electrically erasable programmable read-only memory (EEPROM), a compact disc read-only memory (CD-ROM), another optical disc storage, an optical disc storage (including a compact disc, a laser disc, an optical disc, a digital versatile disc, or a Blu-ray disc), a disk storage medium, or another magnetic storage device; or may be any computer-readable medium that can be used to carry or store desired program code in a form of an instruction or a data structure and can be accessed by a computer.

In an embodiment of the present disclosure, the processor and the memory may be integrated into a processing apparatus. More generally, the processor and the memory are independent components. The processor is configured to execute the program code stored in the memory to implement the methods described in the embodiments of the present disclosure. During specific implementation, the memory may alternatively be integrated into the processor or independent of the processor.

In some embodiments, the devices, apparatus, and modules described in the embodiments of the present disclosure may be specifically implemented by a computer chip or entity, or implemented by a product with a specific function.

Those skilled in the art should understand that the embodiments of the present disclosure may be provided as a method, an apparatus, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media that include computer-usable program code.

In the embodiments provided in the present disclosure, if implemented in a form of a software functional unit and sold or used as a stand-alone product, any function may be stored in a computer-readable storage medium. Based on this understanding, the technical solution of the present disclosure essentially, or a part contributing to the prior art, or some of the technical solutions may be embodied in a form of a software product. The computer software product is stored on a storage medium, and includes several instructions to enable a computer device (which may be a personal computer, a server, a network device, or the like) to execute all or some steps of the methods according to the embodiments of the present disclosure.

An embodiment of the present disclosure provides a computer-readable storage medium. The computer-readable storage medium stores computer programs. The computer programs, when run on a computer, cause the computer executes the methods provided in the embodiments of the present disclosure.

An embodiment of the present disclosure provides a computer program product. The computer program product includes computer programs. The computer programs, when run on a computer, cause the computer to execute the methods provided in the embodiments of the present disclosure.

The embodiments of the present disclosure are described with reference to the flowcharts and/or block diagrams of the method, the device (apparatus), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It should be noted that, in the embodiments of the present disclosure, the term "at least one" refers to one or more, and the term "a plurality of" refers to two or more. The term "and/or" describes associations between associated objects, and it indicates three types of relationships. For example, "A and/or B" may indicate that A exists alone, A and B coexist, or B exists alone. "A" and "B" each may be singular or plural. The character "I" generally indicates that the associated objects are in an "or" relationship. The term "at least one of the followings" or a similar expression refers to any combination of these items, including any combination of single items or plural items. For example, at least one of a, b, and c may represent: a, b, c, a and b, a and c, b and c, or a, b, and c, where a, b, and c may be singular or plural.

The terms "include", "comprise", or any other variations thereof are intended to cover non-exclusive inclusion, such that a process, method, product, or device including a series of elements not only includes those elements, but also includes other elements that are not explicitly listed, or also includes inherent elements of the process, method, product, or device. Without more restrictions, an element defined by the phrase "including a . . . " does not exclude the presence of another same element in a process, method, product, or device that includes the element.

The present disclosure may be described in general contexts of computer executable instructions executed by a computer, such as a program module. Generally, the program module includes a routine, a program, an object, a component, a data structure, and the like that perform specific tasks or implement specific abstract data types. The present disclosure may alternatively be practiced in a distributed computing environment in which a task is performed by a remote processing device connected through a communication network. In the distributed computing environment, the program module may be located in local and remote computer storage media including a storage device.

The embodiments in the present disclosure are described in a progressive manner. For same or similar parts between the embodiments, reference may be made to each other. Each embodiment focuses on a difference from other embodiments. For an apparatus embodiment, since it is basically similar to the method embodiment, the description is relatively simple, and reference can be made to the description of the method embodiment.

Those of ordinary skill in the art may be aware that units and algorithm steps described in the embodiments of the present disclosure can be implemented by electronic hardware or a combination of computer software and electronic hardware. Whether these functions are implemented in hardware or software depends on specific applications of the technical solutions and design constraints. A person skilled in the art may use different methods to implement the described functions for each specific application, but such implementation should not be considered to be beyond the scope of the present disclosure.

A person skilled in the art can clearly understand that, for convenience and brevity of description, reference may be made to corresponding processes in the foregoing method embodiment for specific working processes of the foregoing apparatuses and units. Details are not described herein again.

The above merely describes specific implementations of the present disclosure. Any person skilled in the art can easily conceive modifications or replacements within the technical scope of the present disclosure, and these modifications or replacements shall fall within the protection scope of the present disclosure. Therefore, the scope of the present disclosure should be subject to the scope of the claims.

What is claimed is:

1. A method for configuring a radio frequency (RF) transmit power, comprising:
obtaining an application scenario determining result corresponding to a current application scenario of a communication device;
confirming current customer premises network (CPN) information of the communication device;
confirming current home operator information of the communication device;
performing match retrieval in a power control parameter database based on the application scenario determining result, the current home operator information, and the current CPN information to obtain a power setting parameter value corresponding to the application scenario determining result, the current home operator information, and the current CPN information; and
configuring a transmit power of an RF module based on the power setting parameter value,
wherein said performing the match retrieval in the power control parameter database based on the application scenario determining result, the current home operator information, and the current CPN information comprises:
performing the match retrieval in the power control parameter database of a local device, and
wherein said performing the match retrieval in the power control parameter database based on the application scenario determining result, the current home operator information, and the current CPN information further comprises:
in response to that the power setting parameter value matching the application scenario determining result, the current home operator information, and the current CPN information is not stored in the power control parameter database of the local device, uploading the application scenario determining result, the current home operator information, and the current CPN information to a cloud server in such a manner that the power setting parameter value corresponding to the application scenario determining result, the current home operator information, and the current CPN information is obtained from the cloud serve.

2. The method according to claim 1, further comprising:
confirming the application scenario determining result by an application processor of the communication device.

3. The method according to claim 1, further comprising:
reading the current home operator information and the current CPN information through a communication chip of the communication device.

4. An electronic chip, comprising:
a processor configured to execute computer program instructions stored in a memory, wherein the computer program instructions, when executed by the processor, cause the electronic chip to perform a method for configuring a radio frequency (RF) transmit power, and wherein the method comprises:
obtaining an application scenario determining result corresponding to a current application scenario of a communication device;
confirming current customer premises network (CPN) information of the communication device;
confirming current home operator information of the communication device;
performing match retrieval in a power control parameter database based on the application scenario determining result, the current home operator information, and the current CPN information to obtain a power setting parameter value corresponding to the application scenario determining result, the current home operator information, and the current CPN information; and
configuring a transmit power of an RF module based on the power setting parameter value, wherein said performing the match retrieval in the power control parameter database based on the application scenario determining result, the current home operator information, and the current CPN information comprises:
performing the match retrieval in the power control parameter database of a local device, and wherein said performing the match retrieval in the power control parameter database based on the application scenario determining result, the current home operator information, and the current CPN information further comprises:

in response to that the power setting parameter value matching the application scenario determining result, the current home operator information, and the current CPN information is not stored in the power control parameter database of the local device, uploading the application scenario determining result, the current home operator information, and the current CPN information to a cloud server in such a manner that the power setting parameter value corresponding to the application scenario determining result, the current home operator information, and the current CPN information is obtained from the cloud server.

5. An electronic device, comprising:

a memory configured to store computer program instructions; and a first processor and a second processor that are configured to execute the computer program instructions, wherein the first processor is configured to execute at least one computer program instruction of the computer program instructions stored in the memory, and the at least one computer program instruction, when executed by the first processor, causes the first processor to generate an application scenario determining result based on a current application scenario of a communication device;

wherein the second processor is configured to execute at least one another computer program instruction of the computer program instructions stored in the memory, and the at least one another computer program instruction, when executed by the second processor, causes the second processor to:

obtain the application scenario determining result;

confirm current customer premises network (CPN) information of the communication device;

confirm current home operator information of the communication device;

perform match retrieval in a power control parameter database based on the application scenario determining result, the current home operator information, and the current CPN information to obtain a power setting parameter value corresponding to the application scenario determining result, the current home operator information, and the current CPN information; and configure a transmit power of an RF module based on the power setting parameter value, wherein said performing the match retrieval in the power control parameter database based on the application scenario determining result, the current home operator information, and the current CPN information comprises:

performing the match retrieval in the power control parameter database of a local device, and wherein said performing the match retrieval in the power control parameter database based on the application scenario determining result, the current home operator information, and the current CPN information further comprises:

in response to that the power setting parameter value matching the application scenario determining result, the current home operator information, and the current CPN information is not stored in the power control parameter database of the local device, uploading the application scenario determining result, the current home operator information, and the current CPN information to a cloud server in such a manner that the power setting parameter value corresponding to the application scenario determining result, the current home operator information, and the current CPN information is obtained from the cloud server.

* * * * *